United States Patent [19]

Oglesbee et al.

[11] Patent Number: 5,592,065
[45] Date of Patent: Jan. 7, 1997

[54] BATTERY CHARGER HAVING BATTERY TEMPERATURE MEASUREMENT PROBE

[75] Inventors: John W. Oglesbee, Athens; William C. Bohne, Lawrenceville; Robert W. McGinnis, Grayson, all of Ga.

[73] Assignee: Motorola, Inc., Schaumburg, Ill.

[21] Appl. No.: 554,221

[22] Filed: Nov. 6, 1995

[51] Int. Cl.⁶ ..................................................... H02J 7/00
[52] U.S. Cl. .................................................. 320/2; 320/35
[58] Field of Search .............................. 320/2, 35; 429/8, 429/62, 96, 100, 101; 338/22 R; 374/165, 185

[56] References Cited

U.S. PATENT DOCUMENTS

| | | | |
|---|---|---|---|
| 3,763,416 | 10/1973 | Jache | 320/35 |
| 4,314,008 | 2/1982 | Blake | 429/8 |
| 4,616,171 | 10/1986 | Hernandez et al. | 320/35 X |
| 4,855,571 | 8/1989 | Ting et al. | 338/22 R X |
| 5,013,993 | 5/1991 | Bhagwat et al. | 320/35 |
| 5,382,893 | 1/1995 | Dehnel | 320/35 X |
| 5,459,391 | 10/1995 | Amano | 320/35 |

*Primary Examiner*—Peter S. Wong
*Assistant Examiner*—Patrick B. Law
*Attorney, Agent, or Firm*—Scott M. Garrett; Kenneth M. Massaroni

[57] ABSTRACT

A battery charger (12) is used for recharging a battery pack (10) when the battery pack is placed in a charging pocket (14). The battery pack generates heat upon being recharged, which is collected by a probe (22). The probe senses the temperature and changes in temperature of the battery pack by means of a temperature sensing element disposed (54) therein. The temperature sensing element provides an electrical signal indicative of the temperature of the battery pack to a charging circuit (58). The charging circuit, upon sensing sufficient temperature conditions, modifies the operation of the charger such that only low rate currents are thereafter applied to the battery pack.

15 Claims, 3 Drawing Sheets

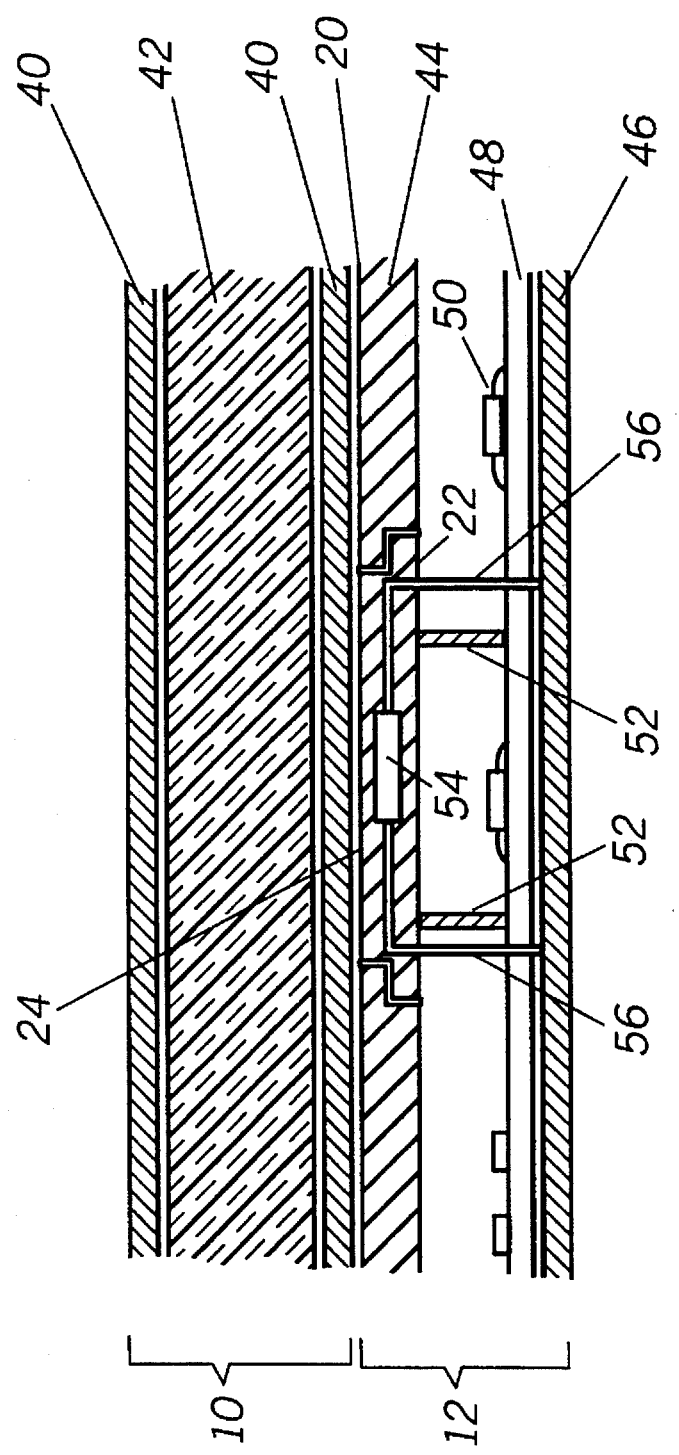

5,592,065

BATTERY CHARGER HAVING BATTERY TEMPERATURE MEASUREMENT PROBE

TECHNICAL FIELD

This invention relates in general to battery chargers, and in particular to battery chargers for charging batteries by sensing the battery temperature, and wherein a battery so charged provides no integral means allowing the charger to sense the battery temperature.

BACKGROUND

Portable electrical devices have gained widespread market acceptance, and have taken numerous forms. Cellular telephones, portable computers, and cordless power tools are but a few examples of such devices. For any such device to be successfully marketed, attention must be given to the means of powering the device. Consideration must be given to the reliability, cost, and ease of use of the power supply. In portable systems the power supply of choice is typically some form of electrochemical battery. For the sake of economy, rechargeable battery packs are preferable to disposable batteries. A rechargeable battery pack has a much higher initial price, but their cost of use is significantly below that of disposable batteries.

The design of a rechargeable battery system depends on the expected use. A device in near constant use, such as a cellular phone, requires a battery pack which can provide the most operation time, and which can be recharged quickly. This has increasingly become the case since many portable devices are operated for extended periods of time. Accordingly, most rechargeable battery systems include a rapid charger which can fully recharge a battery pack in about an hour, although faster systems exist. The process of rapid recharging involves applying a high rate current to the battery pack and observing battery parameters such as voltage and temperature, and changes in those parameters, to determine when to cease rapid charging.

Of the existing rechargeable electrochemical systems, nickel cadmium (ni-cad) and nickel metal hydride (ni-meh) are most commonly used for portable electronic devices. Both of these systems generate heat when they are recharged in a rapid fashion. Ni-cad cells generally stay at a stable temperature until they are nearly fully charged. Ni-meh cells tend to produce heat throughout the charge cycle, but significantly increase heat output when they become fully charged. Coincidentally, the rate of change in temperature for both systems is nearly the same when they become fully charged.

Accordingly, many chargers have been designed to detect this characteristic while rapid charging a given battery pack so that the charger will stop charging before causing damage to the battery. The conventional approach to sensing and measuring the battery pack temperature has been to construct the battery with a temperature sensing element disposed internal to the pack and in close proximity to the battery cell or cells. This adds cost to the battery pack, but given the thickness and material typically used as casing in battery packs, it has been considered necessary for reliable temperature sensing.

However, in some applications the battery pack may not require a conventional housing. Indeed it would be a marketable advantage to use less expensive material for the battery pack case, and eliminate the temperature sensing element. The problem arises, then, as to how to accurately determine the temperature of a battery pack so constructed.

Therefore, there exists a need for a battery charger that can determine the temperature of a battery pack constructed without a temperature sensing element, and reliably and safely recharge such a battery pack.

BRIEF DESCRIPTION OF THE DRAWINGS

FIG. 4 is a side cut-away view of a battery charger in accordance with the invention, with a battery in the battery charger.

DETAILED DESCRIPTION OF THE PREFERRED EMBODIMENT

Figure 1:
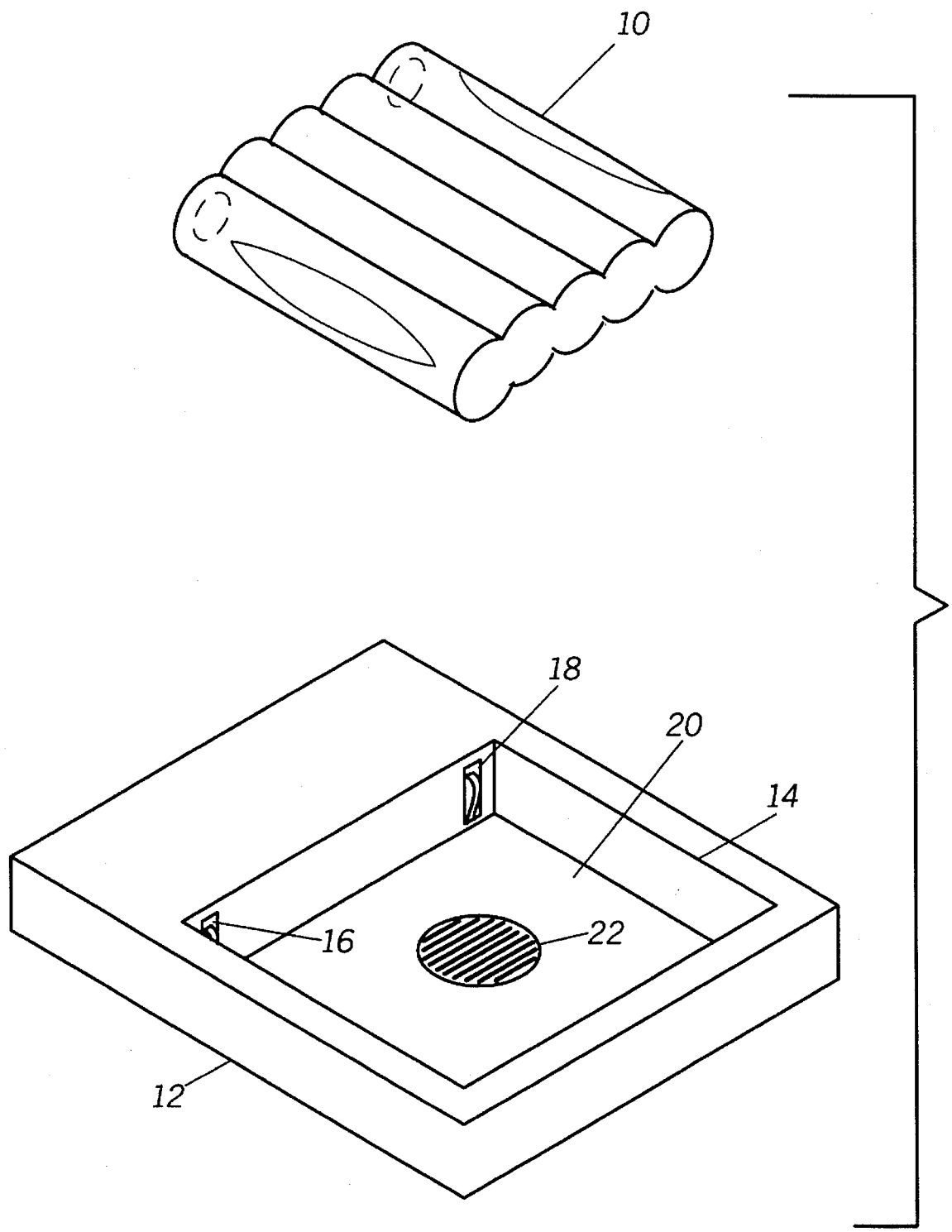
FIG. 1 is a perspective view of a battery pack and a battery charger in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, where there is illustrated therein a perspective view of a battery pack 10 and a battery charger 12 in accordance with the invention. The battery pack comprises a casing and at least one battery cell (shown in phantom). In order to minimize the cost of the battery pack, and optimize the thermal characteristics of the battery pack for the invention, it is preferred that the casing be a thin semi-rigid plastic material, such as shrink wrap, for example. Shrink wrap materials are well known in the art, and are used in a wide variety of battery and battery pack applications. The casing has a pair of openings (shown in phantom) formed therethrough to expose battery terminals such that the charger may electrically connect with the battery cell or cells.

The battery charger 12 has a housing, preferably made of plastic, with a battery receiving pocket 14 formed therein. Disposed in the pocket are at least two battery charging terminals, including positive terminal 16 and negative terminal 18. The terminals are shown on one wall of the pocket 14, but may be disposed in a variety of arrangements such as on opposite walls. The charging terminal 16 and 18 mate with corresponding battery terminals when the battery pack is inserted into the battery receiving pocket. The pocket 14 also has a battery receiving surface 20, which is shown here as the bottom of the pocket 14. The battery receiving surface is a surface upon which the battery rests, and a portion of the battery pack casing is in contact with the battery receiving surface 20 when a battery pack is disposed in the pocket. Accordingly, it is preferable that the battery receiving surface be the bottom of the pocket. The battery receiving surface 20 has an opening formed therethrough, and disposed in the opening is a probe 22. The probe 22 is used to indicate to a battery charging circuit in the battery charger 12 the temperature of the battery pack 10 during the recharging process.

The probe consists of a body having a temperature sensing element disposed therein, as will be described in greater detail hereinbelow. As shown in FIG. 1, the probe 22 is disposed in the opening formed in the battery receiving surface 20. For maximum efficiency, the probe must be located about flush with the battery receiving surface.

Figure 2:
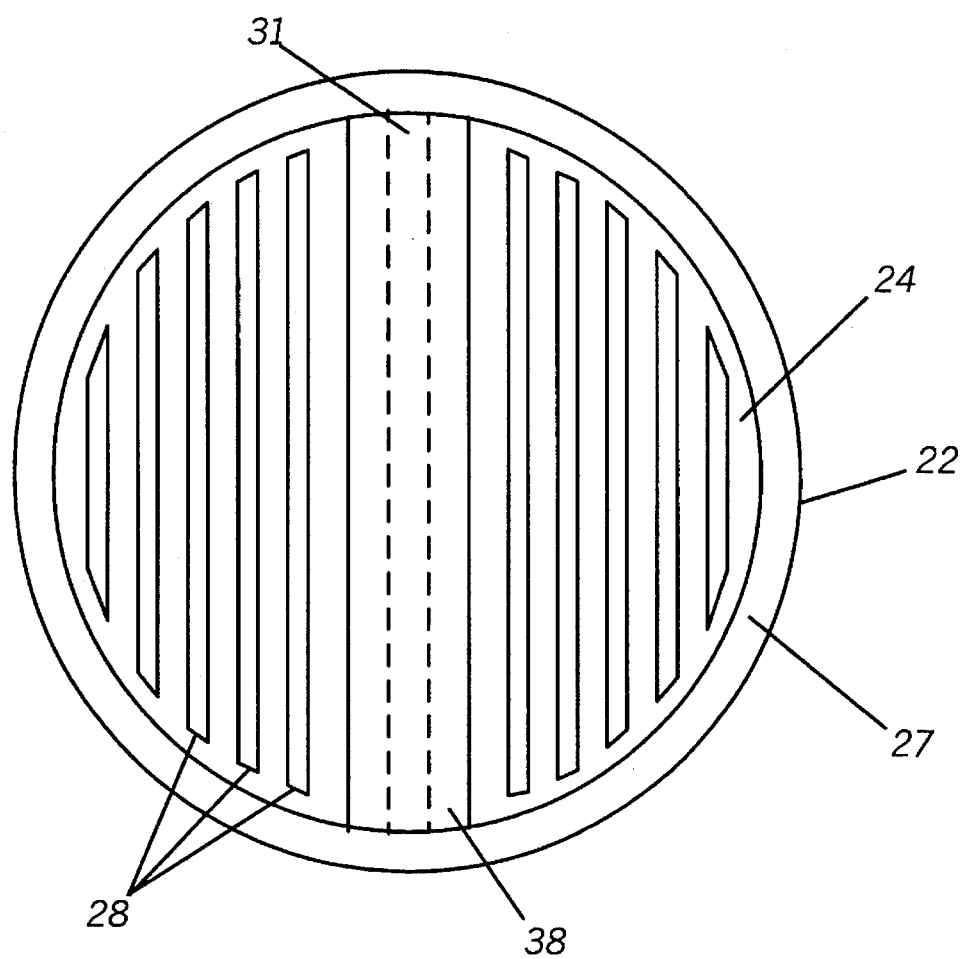
FIG. 2 is a top plan view of a probe for use in a battery charger in accordance with the invention.
Figure 3:
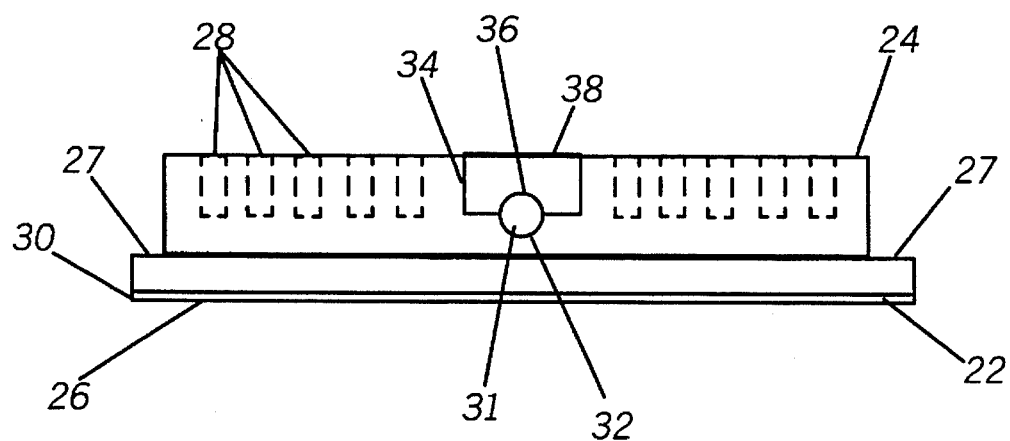
FIG. 3 is a side plan view of a probe for use in a battery charger in accordance with the invention.

To gain an appreciation of the structure of the probe, FIG. 2 and FIG. 3 show different views of a probe in accordance with the invention. Referring now to FIG. 2 and FIG. 3, there is illustrated therein a top plan view and a side plan view, respectively, of a probe 22 for use in a battery charger in accordance with the invention. The probe has a top surface 24, a bottom surface 26, and a retaining lip 27 which extends at least a portion of the way around the probe.

One task of the probe is to collect heat from the battery pack generated during recharging, such that the probe's temperature is very similar to that of the battery pack. Additionally, since in many cases the charger may look for a specific rate of change of temperature of the battery pack in deciding when to stop rapid charging, it is preferable that the probe be able to change temperature at least as fast as the battery pack.

To passively collect as much heat as possible from the battery pack, the top surface 24 should have it's surface area enhanced. To increase the surface area, it would seem obvious that the size of the probe should be increased. However, simply making the probe larger will also increase the amount of material used to make the probe, and thus have no net gain in efficiency. A preferred way of increasing the surface area is to break up the surface such that it is non-flat. An example is to form the top surface with a plurality of pockets formed in the surface. The probe is shown here with a series of parallel groves 28, but one skilled in the art will appreciate that there are numerous ways to achieve a non-flat surface. Providing the parallel groves 28 also helps accomplish the goal of being able to change temperature with the battery pack since by removing material from the top surface, the probe has less mass, and therefore less energy is needed to change its temperature.

As a further enhancement of the heat collecting ability of the probe, it is preferred that the top surface have a textured matte finish such that the coefficient of thermal emissivity is at least 0.9. That is, at least 90% of the thermal energy radiated to the top surface of the probe from the battery pack is absorbed. The shrink wrap casing of the battery pack should be a dark color, preferably black, to allow the most efficient radiation from the pack. Additionally, it is preferred that the bottom surface 26 be flat, smooth, with a shiny finish. It may be advantageous to provide a heat reflective cover layer 30 on the bottom surface, such as a layer of metalization or a metal foil. In general, it is preferred that the bottom surface have a coefficient of thermal emissivity of not more than 0.1. That is, no more than 10% of the heat energy radiated from the probe incident with the bottom surface escapes.

To accomodate the temperature sensing element, a bore 31 is formed through the probe. For the sake of simplicity, it is preferred that the bore is formed between a lower groove 32 formed in the bottom of a slot 34 extending across the probe, and an upper groove 36 formed in a plug 38 disposed in the slot. The bore results from the space between the lower groove 32 and the upper groove 36 when the plug is seated in the slot. The use of a slot and plug is preferred because it reduces the number of operations required for assembly. Other less preferred means of forming the bore are contemplated, such as, for example, drilling the bore through the probe.

In fabricating the probe it is important to choose a material that allows the desired thermal performance. For example, the material must have a specific heat which allows the material to change temperature at least as fast as the battery pack will during recharging. The typical rate of change considered by many manufacturers to be indicative of a fully charged battery is an increase of about 1.6° C./3 minutes. Compared to thermal events in other fields, this is a relatively slow rate of change. Therefore, there exist numerous materials that can perform adequately. Materials that can change temperature at faster rates than this may be prohibitively expensive. Through experimentation, it has been determined that, in general, plastics function adequately for probe material. In some cases aluminum may be a slightly better choice, but for most applications a plastic should suffice.

An appreciation of the manner of practicing the invention may be obtained by a perusal of FIG. 4. Referring now to FIG. 4, there is illustrated therein a side cut-away view of a battery charger 12 in accordance with the invention, with a battery pack 10 in the battery charger. Shown for the battery is the casing 40 and a battery cell 42. The battery charger comprises an upper housing 44 having a battery receiving surface, a lower housing 46, a circuit board 48 having charger circuit components 50 disposed thereon, and a probe 22. The probe is seated or disposed in an opening formed in the battery receiving surface such that it is thermally isolated from the upper housing 44. This is accomplished by the use of either an air gap which extends around the probe between it and the upper housing, or by a gasket disposed around the probe between the probe and the upper housing. The probe is supported by a standoff or spacer 52 between the probe and the circuit board 48. Alternatively it is contemplated that the probe may be snapped into place in the upper housing at discrete points such that thermal isolation is not significantly compromised. The probe is seated such that its top surface 24 is about flush with the battery receiving surface.

Disposed in the probe, and more specifically in the bore of the probe, is a temperature sensing element 54, such as, for example, a thermistor. The temperature sensing element is connected to the charging circuit by leads 56, and transmits an electrical signal indicative of the heat of the battery pack to the charging circuit. While the battery pack is recharged, it generates heat. Depending on the type of chemistry used by the battery cells, the battery pack may initially generate little or no heat. Upon reaching a fully charged condition, however, heat will be generated. This heat causes the battery packs temperature to increase. The probe is designed to collect a portion of the heat generated by the battery such that its temperature matches that of the battery pack with only a small lag. Once the battery pack has reached either an appropriate absolute temperature, or if the rate of change of temperature indicates a fully charged state has been reached, the charging circuit modifies the operation of the charger. In general, the charger will cease applying a rapid or high rate charging current and begin a trickle or maintenance current which is 5%–10% of the high rate.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery charger for charging a battery pack, said battery pack generating a temperature and a temperature change when recharged, said charger comprising:

a housing having a battery receiving surface, said battery receiving surface having an opening formed therethrough;

a charging circuit for recharging said battery pack; and a probe disposed in said opening and thermally isolated from said housing for thermally coupling with said battery pack, and having a temperature sensing element disposed therein for transmitting an electrical signal indicative of said temperature and temperature change to said charging circuit, and further having a top surface and a bottom surface, said top surface having a surface area and pockets formed in said top surface for enhancing said surface area.

2. A battery charger as defined by claim 1, wherein said probe is thermally isolated from said housing by an air gap formed between said probe and said housing, said air gap extending substantially around said probe.

3. A battery charger as defined by claim 1, wherein said probe is thermally isolated from said housing by a gasket disposed between said probe and said housing, said gasket extending substantially around said probe.

4. A battery charger as defined by claim 1, wherein said top surface of said probe has a textured matte finish and a thermal emissivity of at least 0.9.

5. A battery charger as defined by claim 1, wherein said pockets formed in said top surface are a series of parallel groves.

6. A battery charger as defined by claim 1, wherein said bottom surface is smooth and has a thermal emissivity of not more than 0.1.

7. A battery charger as defined by claim 6, wherein said bottom surface of said probe comprises a heat reflective cover layer.

8. A battery charger as defined by claim 7, wherein said a heat reflective cover layer is a metal foil.

9. A battery charger as defined by claim 1, wherein said temperature sensing element is a thermistor.

10. A probe for use with a battery charger, said battery charger having a charging circuit housed therein and a housing having a battery receiving surface with an opening formed therethrough, said battery charger for charging a battery, said battery generating temperature and temperature change upon being recharged, said probe disposed in said opening and thermally isolated from said housing, said probe comprising:

a top surface and a bottom surface, said top surface having a surface area and a textured matte finish, said bottom surface being smooth;

a plurality of pockets formed in said top surface for increasing said surface area; and a temperature sensing element disposed within said probe for transmitting an electrical signal indicative of said temperature and temperature change to said charging circuit.

11. A probe as defined by claim 10, wherein said top surface has a thermal emissivity of at least 0.9.

12. A probe as defined by claim 10, wherein said pockets formed in said top surface are a series of parallel groves.

13. A probe as defined by claim 10, wherein said bottom surface has a thermal emissivity of not more than 0.1.

14. A probe as defined by claim 10, wherein said bottom surface of said probe comprises a heat reflective cover layer.

15. A probe as defined by claim 14, wherein said a heat reflective cover layer is a metal foil.

* * * * *